United States Patent
Xiong et al.

(10) Patent No.: US 9,692,953 B2
(45) Date of Patent: Jun. 27, 2017

(54) CAMERA-LENS AUTOMATIC POP-UP ASSEMBLY

(71) Applicant: Xiaomi Inc., Beijing (CN)

(72) Inventors: Ying Xiong, Beijing (CN); Fenghui Wu, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 15/060,614

(22) Filed: Mar. 4, 2016

(65) Prior Publication Data

US 2017/0064166 A1 Mar. 2, 2017

(30) Foreign Application Priority Data

Sep. 2, 2015 (CN) .......................... 2015 1 0557208

(51) Int. Cl.
*H04N 5/232* (2006.01)
*H04N 5/225* (2006.01)

(52) U.S. Cl.
CPC .................................. *H04N 5/2254* (2013.01)

(58) Field of Classification Search
CPC ............... H04N 5/2252; H04N 5/2253; H04N 2007/145; H04N 5/2256; H04N 5/2257; H04N 5/2354; H04N 7/142; H04M 1/0214; H04M 1/0235; H04M 1/0264; H04M 2250/20
See application file for complete search history.

(56) References Cited

U.S. PATENT DOCUMENTS

| | | | | |
|---|---|---|---|---|
| 8,194,181 B2 * | 6/2012 | Tsai | ...................... | H04N 5/2251 348/340 |
| 8,471,956 B2 * | 6/2013 | Fortmann | ............. | G06F 1/1613 348/373 |
| 2002/0067426 A1 * | 6/2002 | Nagata | ................. | H04N 5/2251 348/373 |
| 2004/0001157 A1 * | 1/2004 | Chan | .................... | H04N 5/2253 348/335 |
| 2005/0014527 A1 | 1/2005 | Chambers et al. | | |
| 2005/0225668 A1 * | 10/2005 | Kim | ..................... | H04N 5/2253 348/373 |

(Continued)

FOREIGN PATENT DOCUMENTS

CN 201821392 U 5/2011
CN 102927423 A 2/2013

(Continued)

OTHER PUBLICATIONS

The International Search Report for PCT/CN2015/099026.
The extended European Search Report for 16161640.4.

*Primary Examiner* — Amy Hsu
(74) *Attorney, Agent, or Firm* — Jun He Law Offices P.C.; James J. Zhu (57) ABSTRACT

A camera-lens automatic pop-up assembly and a terminal device are provided. The assembly comprises a camera lens, a first elastic member, a rotating member, a slide-rail switch and a second elastic member. The camera lens is connected with one end of the first elastic member and a body of the terminal device, respectively. A side of the camera lens is provided with a connection groove and the other end of the first elastic member is connected with the body. The slide-rail switch is connected with the body through the second elastic member.

10 Claims, 4 Drawing Sheets

(56) References Cited

U.S. PATENT DOCUMENTS

| | | | |
|---|---|---|---|
| 2006/0073858 A1* | 4/2006 | Nagashima | H04M 1/0237 455/575.4 |
| 2010/0079661 A1* | 4/2010 | Lin | H04N 5/2257 348/371 |
| 2015/0062333 A1* | 3/2015 | Kilner | H04N 5/2252 348/143 |
| 2015/0274089 A1* | 10/2015 | Schutz | B60R 11/04 224/567 |

FOREIGN PATENT DOCUMENTS

| | | |
|---|---|---|
| CN | 103501403 A | 1/2014 |
| CN | 103581523 A | 2/2014 |
| CN | 104023190 A | 9/2014 |
| CN | 104618542 A | 5/2015 |
| CN | 105141815 A | 12/2015 |
| EP | 0930770 A2 | 7/1999 |
| EP | 2819386 A1 | 12/2014 |
| JP | 10-248029 A | 9/1998 |
| JP | 2003-333385 A | 11/2003 |

\* cited by examiner

CAMERA-LENS AUTOMATIC POP-UP ASSEMBLY

CROSS-REFERENCE TO RELATED APPLICATIONS

This application is based upon and claims the benefit of priority of Chinese Patent Application No. 201510557208.8, filed on Sep. 2, 2015, the entire contents of which are incorporated herein by reference.

TECHNICAL FIELD

The present disclosure relates to communication technology, particularly to a camera-lens automatic pop-up assembly and a terminal device with the camera-lens automatic pop-up assembly.

BACKGROUND

With the upgrading of the function of a camera lens of a terminal device, more and more users choose to use a mobile phone, a tablet PC and other terminal devices to shoot a scene. Currently, the camera lens of a terminal device in a market is a fixed embedded type. That is, the camera lens is embedded in the surface of a shell of the terminal device, slightly protruding over the surface of the shell.

SUMMARY

Accordingly, the disclosure provides a camera-lens automatic pop-up assembly and a terminal device with the camera-lens automatic pop-up assembly.

According to a first aspect of embodiments of the present disclosure, there is provided a camera-lens automatic pop-up assembly, including: a camera lens, a first elastic member, a rotating member, a slide-rail switch and a second elastic member. The camera lens is connected with one end of the first elastic member and a body of a terminal device, respectively; a side of the camera lens is provided with a connection groove. The other end of the first elastic member is connected with the body. The rotating member is connected with the connection groove and the slide-rail switch respectively. The slide-rail switch is connected with the body through the second elastic member. When the slide-rail switch is pressed downwards, the slide-rail switch rotates the rotating member so that the rotating member is separated away from the connection groove and the first elastic member pops up the camera lens; after the camera lens is popped up, the camera lens is pressed down so that the first elastic member is compressed; the connection groove is clamped with the rotating member; the rotating member rotates the slide-rail switch so that the slide-rail switch is reset. After the slide-rail switch has been reset, the second elastic member fixes the slide-rail switch.

According to a second aspect of embodiments of the present disclosure, there is provided a terminal device, including: a camera-lens automatic pop-up assembly and a body. The camera-lens automatic pop-up assembly includes a camera lens, a first elastic member, a rotating member, a slide-rail switch and a second elastic member. The camera lens is connected with one end of the first elastic member and the body of the terminal device, respectively; a side of the camera lens is provided with a connection groove. The other end of the first elastic member is connected with the body. The rotating member is connected with the connection groove and the slide-rail switch respectively. The slide-rail switch is connected with the body through the second elastic member. When the slide-rail switch is pressed downwards, the slide-rail switch rotates the rotating member so that the rotating member is separated away from the connection groove and the first elastic member pops up the camera lens; after the camera lens is popped up, the camera lens is pressed down so that the first elastic member is compressed; the connection groove is clamped with the rotating member; the rotating member rotates the slide-rail switch so that the slide-rail switch is reset. After the slide-rail switch has been reset, the second elastic member fixes the slide-rail switch.

The technical solution provided by the embodiments of the present disclosure may includes the following advantageous effects: The camera-lens automatic pop-up assembly enables the camera lens to automatically pop up and back, so that the camera lens can be accommodated in a shell, thus avoiding the damage to the camera lens. Meanwhile, the terminal device has more beautiful appearance.

It is to be understood that both the foregoing general description and the following detailed description are exemplary and explanatory only and are not restrictive of the invention.

BRIEF DESCRIPTION OF THE DRAWINGS

The accompanying drawings, incorporated in and constitute a part of this specification, illustrate embodiments consistent with the invention and, together with the description, serve to explain the principles of the invention.

DESCRIPTION OF REFERENCE NUMBERS

| | |
|---|---|
| Body: 10 | Camera Lens: 11 |
| First Elastic Member: 12 | Rotating Member: 13 |
| Slide-rail Switch: 14 | Second Elastic Member: 15 |
| Spring Base: 101 | Rotating Shaft: 102 |
| Switch Passage: 103 | Convex Plate: 104 |
| Connection Groove: 111 | Upper Connection Board: 131 |
| Lower Connection Board: 132 | Receiving Board: 133 |
| Circular Through Hole: 134 | Slide Rail: 141 |
| Slide Button: 142 | Connection Plug: 143 |

Connection Hole: 144

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
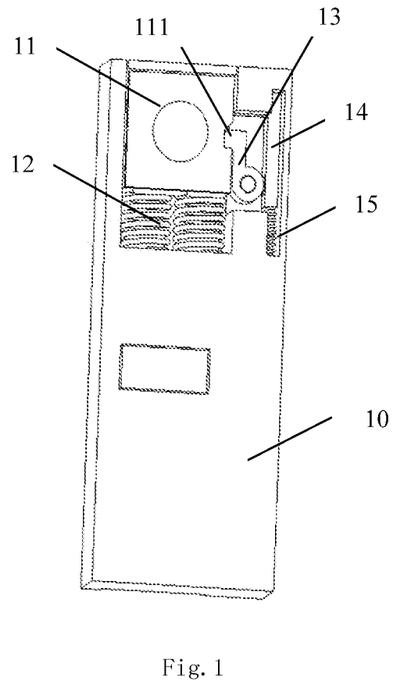
FIG. 1 is a block diagram showing a camera-lens automatic pop-up assembly, according to an exemplary embodiment.

FIG. 1 is a block diagram showing a camera-lens automatic pop-up assembly, according to an exemplary embodiment. As shown in FIG. 1, the camera-lens automatic pop-up assembly includes a camera lens 11, a first elastic member 12, a rotating member 13, a slide-rail switch 14 and a second elastic member 15.

The camera lens 11 is connected with one end of the first elastic member 12 and body 10 of the terminal device, respectively. The side of the camera lens 11 is provided with a connection groove 111. The other end of the first elastic member 12 is connected with the body 10. The rotating member 13 is connected with the connection groove 111 and the slide-rail switch 14 respectively. The slide-rail switch 14 is connected with the body 10 through the second elastic member 15. When the slide-rail switch 14 is pressed downwards, the slide-rail switch 14 rotates the rotating member 13 so that the rotating member 13 is separated away from the connection groove 111 and the first elastic member 12 pops up the camera lens 11. After the camera lens 11 is popped up, the camera lens 11 is pressed down so that the first elastic member 12 is compressed. The connection groove 111 is clamped with the rotating member 13. The rotating member 13 rotates the slide-rail switch 14 so that the slide-rail switch 14 resets. After the slide-rail switch 14 is reset, the second elastic member 15 fixes the slide-rail switch 14.

Figure 2:
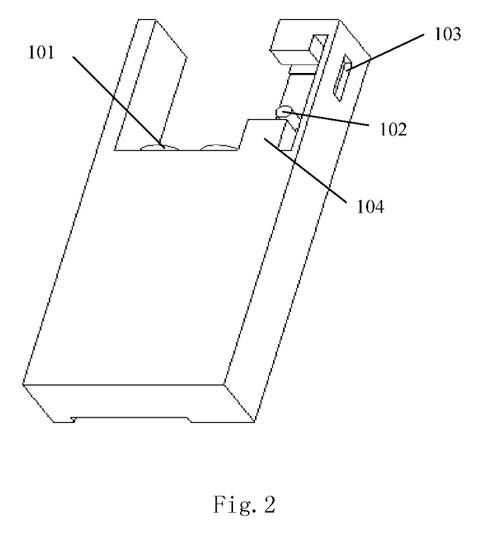
FIG. 2 is a structural diagram showing a body, according to an exemplary embodiment.

FIG. 2 is a structural diagram showing a body, according to an exemplary embodiment. As shown in FIG. 2, the body 10 is provided thereon with a spring base 101. The first elastic member 12 includes one or a plurality of springs. The other end of the first elastic member 12 is connected with the body 10 through the spring base 101. The other end of the first elastic member 12 is connected with the camera lens 11. The camera lens 11 may be popped up under the effect of the elastic force generated by the first elastic member 12. The body 10 is also provided thereon with a rotating shaft 102 and a switch passage 103. Optionally, the body 10 is also provided thereon with a limiting convex plate 104.

Figure 3:
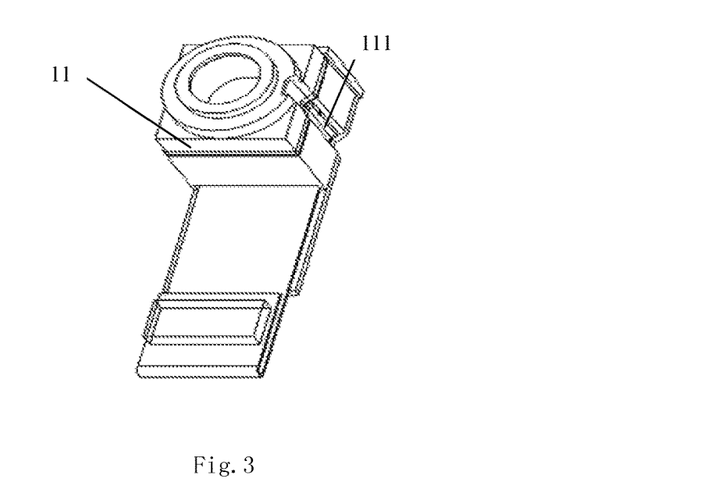
FIG. 3 is a structural diagram showing a camera lens, according to an exemplary embodiment.

FIG. 3 is a structural diagram showing a camera lens, according to an exemplary embodiment. As shown in FIG. 3, the side of the camera lens 11 is provided with the connection groove 111. This embodiment does not limit the shape, size and depth of the connection groove 111. The connection groove 111 is configured to be clamped with and connected with the rotating member 13. The camera lens 11 is also connected with the first elastic member 12, clamped with and separated away from the connection groove 111 through the rotating member 13, and matches with the first elastic member to pop up and back the camera lens 11. The camera lens 11 is also connected with the body 10. The camera lens 11 is electrically connected with a main board in the body 10 through a circuit board so that the camera lens 11 is communicated with the main board.

This embodiment does not limit a specific structure of the rotating member 13. One end of the rotating member 13 is clamped with and connected with the connection groove 111, and the other end of the rotating member 13 is connected with the slide-rail switch 14. When the slide-rail switch 14 is pressed downwards, the slide-rail switch 14 may rotate the rotating member 13 so that the rotating member 13 is separated away from the connection groove 111.

Figure 4:
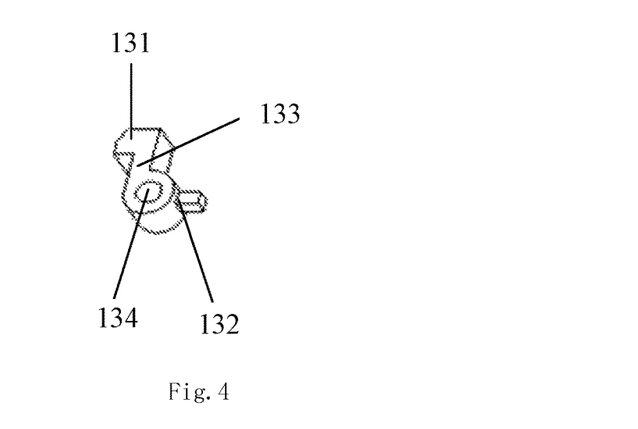
FIG. 4 is a structural diagram showing a rotating member, according to an exemplary embodiment.

FIG. 4 is a structural diagram showing a rotating member, according to an exemplary embodiment. As shown in FIG. 4, the rotating member 13 is a Z-shaped structure. The rotating member 13 includes an upper connection board 131, a lower connection board 132 and a holding board 133 positioned between the upper connection board 131 and the lower connection board 133. The upper connection board 131 and a bending part of the holding board 133 form a right angle. The upper connection board 132 and the bending part of the holding board 133 form an arc shape. Of course, the upper connection board 131 and the bending part of the holding board 133, as well as the lower connection board 132 and the bending part of the holding board 133 may form other shapes.

Wherein the upper connection board 131 is clamped with the connection groove 111 when the camera lens 11 is not popped up. The holding board 133 is provided thereon with a circular through hole 134. The through hole 134 matches with the rotating shaft 102 provided on the body 10 so that the rotating member 13 rotates relative to the rotating shaft 102. If the rotating member 13 rotates relative to the rotating shaft 102, the diameter of the through hole 134 must be larger than that of the rotating shaft 102. The rotating shaft 102 may also limit the rotating member 13 to move upwards and downwards. As shown in FIG. 2, a limiting convex plate 104 may also limit the range that the rotating member 13 moves upwards and downwards. The lower connection board 132 is configured to be connected with the slide-rail switch 14.

Figure 5:
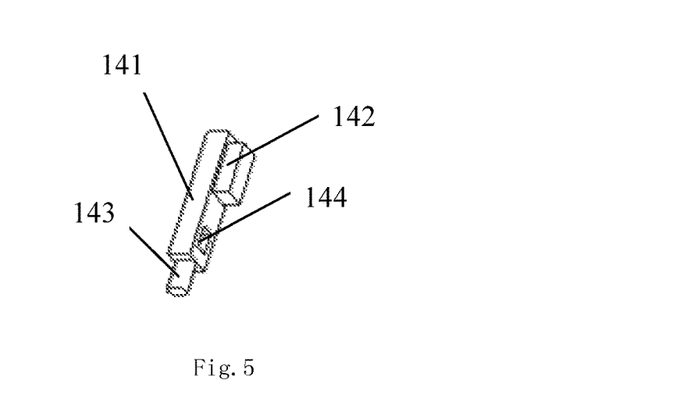
FIG. 5 is a structural diagram showing a slide-rail switch, according to an exemplary embodiment.

FIG. 5 is a structural diagram showing a slide-rail switch, according to an exemplary embodiment. As shown in FIG. 5, the slide-rail switch 14 includes a slide rail 141, a slide button 142 and a connection plug 143. The slide button 142 is provided on the slide rail 141. The slide button 142 may slide along the slide rail 141. One end of the connection plug 143 is connected with the lower end of the slide rail 141, and the other end of the connection plug 143 is connected with the second elastic member 15. A connection hole 144 is also provided at one end of the slide rail where the slide rail is connected with the connection plug 143.

The slide button 142 is provided through a switch passage 103 on the body 10 and exposed out of the body 10. The lower connection board 132 is inserted into the connection hole 144. The shape of the connection hole 144 may be rectangle. Optionally, the shape of the connection hole 144 may be circular. The shape and size of the lower connection board 132 are suitable for the shape and size of the connection hole 144. That is, if the shape of the connection hole 144 is rectangle, the shape of the lower connection board 132 is also rectangle; if the shape of the connection hole 144 is circular, the shape of the lower connection board 132 is also circular. The lower connection board 132 may also be connected with the slide-rail switch 14 in a welding way or a screw joint way. That is, the slide-rail switch 14 is provided thereon with one screw hole. The lower connection board 132 is screw-shaped.

The second elastic member 15 may be one spring. The elastic force of the second elastic member 15 is larger than that of the first elastic member 13. The body 10 is provided thereon with the spring base. One end of the second elastic member 15 is connected with the spring base, and the other end of the second elastic member 15 is connected with the connection plug 143 of the slide-rail switch 14.

Figure 6:
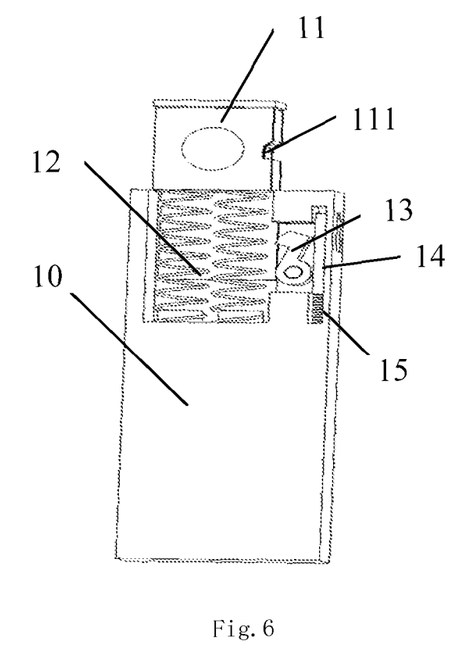
FIG. 6 is a schematic diagram of the state of a camera-lens automatic pop-up assembly after the camera lens has been popped up.

The automatic pop-up assembly of this embodiment operates as follows: it is assumed that the camera lens 11 is under a pop-back state initially. That is, the camera lens 11 is accommodated within the body 10 of the terminal device. When the camera lens 11 needs to be popped up, a user presses downwards the slide button 142 on the slide-rail switch. The slide-rail switch 14 rotates the rotating member 13. The rotating member 13 is separated away from the connection groove 111 on the camera lens 11 after rotating. The camera lens 11 is popped up under the effect of the elastic force generated by the first elastic member 12. FIG. 6 is a schematic diagram of the state of a camera-lens automatic pop-up assembly after the camera lens has been popped up. It can be seen that when the camera lens 11 is under a pop-up state, the first elastic member 12 is under an extension state while the second elastic member 15 is under a compression state.

After the camera lens 11 is popped up, if the camera lens 11 needs to be popped back, the camera lens 11 is pressed down so that the first elastic member 12 is compressed. The rotating member 13 is clamped with the connection groove 111, transmits a force to the slide-rail switch 14 through the rotating member 13, and rotates the slide-rail switch 14 so that the slide-rail switch 14 is reset. After the slide-rail switch 14 has been reset, under the effect of an extension force generated by the second elastic member 15, the slide-rail switch 14 is fixed to ensure the camera lens not to be popped up. FIG. 6 is a schematic diagram of the state of a camera-lens automatic pop-up assembly after a camera lens has been popped back. It can be seen that when the camera lens 11 is under a pop-back state, the first elastic member 12 is under a compression state while the second elastic member 15 is under an extension state.

With the embodiment of the present disclosure, the camera-lens automatic pop-up assembly includes the camera lens, the first elastic member, the rotating member, the slide-rail switch and the second elastic member. The camera lens is connected with one end of the first elastic member and the body of the terminal device, respectively. The side of the camera lens is provided with a connection groove. The other end of the first elastic member is connected with the body. The slide-rail switch is connected with the body through the second elastic member. When the slide-rail switch is pressed downwards, the slide-rail switch rotates the rotating member so that the rotating member is separated away from the connection groove and the first elastic member pops up the camera lens. After the camera lens is popped up, the camera lens is pressed down so that the first elastic member is compressed. The connection groove is clamped with the rotating member. The rotating member rotates the slide-rail switch so that the slide-rail switch is reset. After the slide-rail switch has been reset, the second elastic member fixes the slide-rail switch. The camera-lens automatic pop-up assembly enables the camera lens to automatically pop up and back, so that the camera lens can be accommodated in a shell, thus avoiding the damage to the camera lens. Meanwhile, the terminal device has more beautiful appearance.

Figure 7:
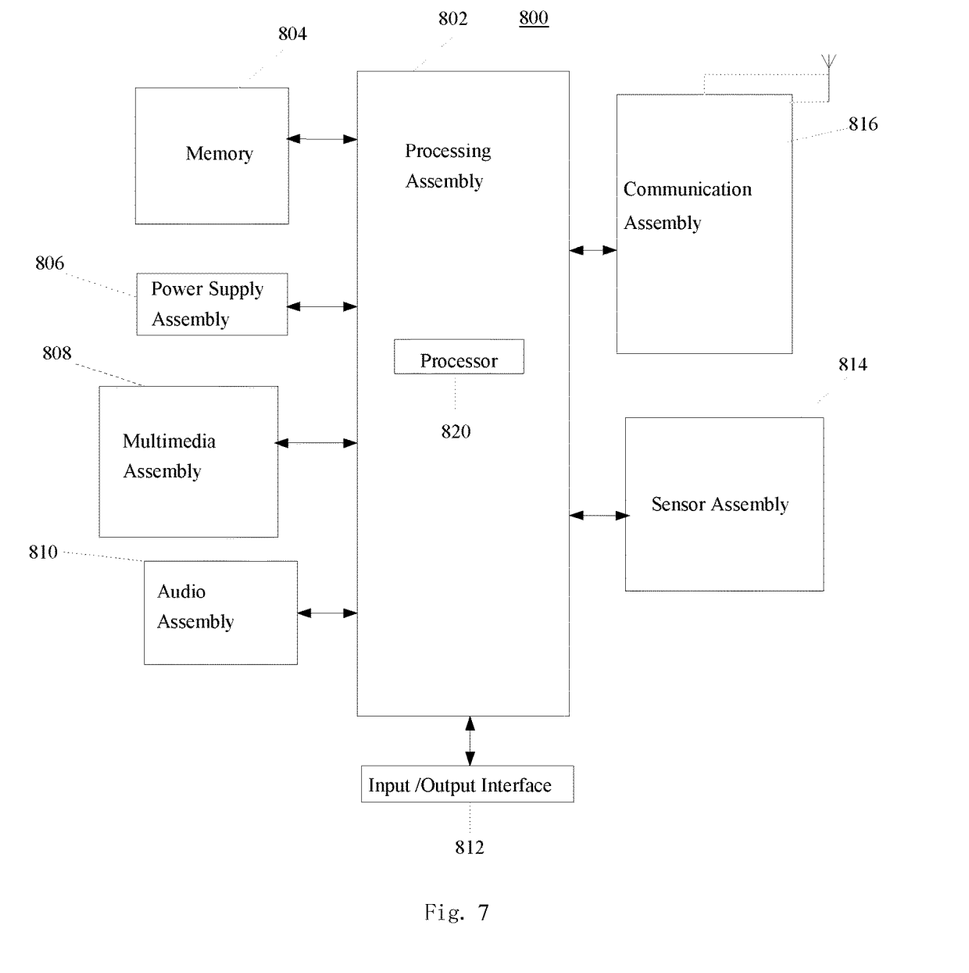
FIG. 7 is a block diagram showing a terminal device, according to an exemplary embodiment.

FIG. 7 is a schematic diagram of a terminal device according to an exemplary embodiment. For example, the terminal device 800 may be a mobile phone, a computer, a digital broadcast terminal device, a messaging assembly, a gaming console, a tablet, a medical assembly, exercise equipment, a personal digital assistant or the like.

Referring to FIG. 7, the terminal device 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the terminal device 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 1808 and the processing component 802.

The memory 804 is configured to store various types of data to support the operation of the terminal device 800. Examples of such data include instructions for any applications or methods operated on the terminal device 800, contact data, phonebook data, messages, pictures, video, etc. The memory 1804 may be implemented using any type of volatile or non-volatile memory assemblys, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal device 800. The power component 806 may include a power management system, one or more power sources, and any other components associated with the generation, management, and distribution of power in the terminal device 800.

The multimedia component 808 includes a screen providing an output interface between the terminal device 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal device 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal device 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like.

The buttons may include, but are not limited to, a home button, a volume button, a starting button, and a locking button.

The sensor component 814 includes one or more sensors to provide status assessments of various aspects of the terminal device 800. For instance, the sensor component 1814 may detect an open/closed status of the terminal device 800, relative positioning of components, e.g., the display and the keypad, of the terminal device 800, a change in position of the terminal device 800 or a component of the terminal device 800, a presence or absence of user contact with the terminal device 800, an orientation or an acceleration/deceleration of the terminal device 800, and a change in temperature of the terminal device 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal device 800 and other assemblys. The terminal device 800 can access a wireless network based on a communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 800 may be implemented with one or more application specific integrated circuits (ASICs), digital signal processors (DSPs), digital signal processing assemblys (DSPDs), programmable logic assemblys (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 804, executable by the processor 820 in the terminal device 800, for performing the above-described methods. For example, the non-transitory computer-readable storage medium may be a ROM, a RAM, a CD-ROM, a magnetic tape, a floppy disc, an optical data storage assembly, and the like.

With respect to exemplary embodiments, the multimedia member 808 may also include the camera-lens automatic pop-up assembly. The camera-lens automatic pop-up assembly includes the camera lens, the first elastic member, the rotating member, the slide-rail switch and the second elastic member.

The camera lens is connected with one end of the first elastic member and the body of the terminal device 800, respectively. The side of the camera lens is provided with the connection groove.

The other end of the first elastic member is connected with the body.

The rotating member is connected with the connection groove and the slide-rail switch respectively. The slide-rail switch is connected with the body through the second elastic member. When the slide-rail switch is pressed downwards, the slide-rail switch rotates the rotating member so that the rotating member is separated away from the connection groove and the first elastic member pops up the camera lens. After the camera lens is popped up, the camera lens is pressed down so that the first elastic member is compressed. The connection groove is clamped with the rotating member. The rotating member rotates the slide-rail switch so that the slide-rail switch is reset.

After the slide-rail switch has been reset, the second elastic member fixes the slide-rail switch.

The rotating member is a Z-shaped structure. The rotating member includes the upper connection plate, the lower connection plate and the receiving plate positioned between the upper connection plate and the lower connection plate. The upper connection board 131 is clamped with the connection groove 111 when the camera lens 11 is not popped up. The holding board is provided thereon with a circular through-hole. The through-hole matches with the rotating shaft provided on the body so that the rotating member is rotated. The lower connection board is connected with the slide-rail switch.

The slide-rail switch includes the slide rail, the slide button and the connection plug. The slide-rail button is provided on the slide rail and may slide along the slide rail. One end of the connection plug is connected with the lower end of the slide rail, and the other end of the connection plug is connected with the second elastic member. The connection hole is also provided at one end of the slide rail, where the slide rail is connected with the connection plug. The lower connection board is inserted into the connection hole.

The upper connection plate and the bending part of the holding board form the right angle. The lower connection board and the bending part of the holding board form the arc shape.

Those skilled in the art may think of easily other embodiments of the invention from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A camera-lens automatic pop-up assembly, comprising:
a camera lens, a first elastic member, a rotating member, a slide-rail switch and a second elastic member; wherein:
the camera lens is connected with one end of the first elastic member and a body of a terminal device, respectively, and a side of the camera lens is provided with a connection groove;
the other end of the first elastic member is connected with the body;

the rotating member is connected with the connection groove and the slide-rail switch respectively, the slide-rail switch is connected with the body through the second elastic member, when the slide-rail switch is pressed downwards, the slide-rail switch rotates the rotating member so that the rotating member is separated away from the connection groove and the first elastic member pops up the camera lens;

after the camera lens is popped up, the camera lens is pressed down so that the first elastic member is compressed, the connection groove is clamped with the rotating member, and the rotating member rotates the slide-rail switch so that the slide-rail switch is reset;

after the slide-rail switch has been reset, the second elastic member fixes the slide-rail switch.

2. The camera-lens automatic pop-up assembly according to claim 1, wherein the rotating member is a Z-shaped structure, and the rotating member comprises an upper connection board, a lower connection board and a holding board positioned between the upper connection board and the lower connection board; and wherein the upper connection board is clamped with the connection groove when the camera lens is not popped up;

the holding board is provided thereon with a circular through-hole, and the through-hole matches with a rotating shaft provided on the body so that the rotating member is rotated;

the lower connection board is connected with the slide-rail switch.

3. The camera-lens automatic pop-up assembly according to claim 2, wherein the slide-rail switch comprises a slide rail, a slide button and a connection plug; and wherein the slide button is provided on the slide rail, and the slide button is slidable along the slide rail;

one end of the connection plug is connected with a lower end of the slide rail, and the other end of the connection plug is connected with the second elastic member;

a connection hole is also provided at one end of the slide rail, where the slide rail is connected with the connection plug, and the lower connection board is inserted into the connection hole.

4. The camera-lens automatic pop-up assembly according to claim 2, wherein the upper connection board and a bending part of the holding board form a right angle, and the lower connection board and the bending part of the holding board form an arc shape.

5. The camera-lens automatic pop-up assembly according to claim 3, wherein the upper connection board and a bending part of the holding board form a right angle, and the lower connection board and the bending part of the holding board form an arc shape.

6. A terminal device, comprising a camera-lens automatic pop-up assembly and a body; wherein:

the camera-lens automatic pop-up assembly comprises a camera lens, a first elastic member, a rotating member, a slide-rail switch and a second elastic member;

the camera lens is connected with one end of the first elastic member and the body of the terminal device, respectively, and a side of the camera lens is provided with a connection groove;

the other end of the first elastic member is connected with the body;

the rotating member is connected with the connection groove and the slide-rail switch respectively, the slide-rail switch is connected with the body through the second elastic member, when the slide-rail switch is pressed downwards, the slide-rail switch rotates the rotating member so that the rotating member is separated away from the connection groove and the first elastic member pops up the camera lens;

after the camera lens is popped up, the camera lens is pressed down so that the first elastic member is compressed, the connection groove is clamped with the rotating member, and the rotating member rotates the slide-rail switch so that the slide-rail switch is reset;

after the slide-rail switch has been reset, the second elastic member fixes the slide-rail switch.

7. The terminal device according to claim 6, wherein the rotating member is a Z-shaped structure, the rotating member comprises an upper connection board, a lower connection board and a holding board positioned between the upper connection board and the lower connection board; and wherein the upper connection board is clamped with the connection groove when the camera lens is not popped up;

the holding board is provided thereon with a circular through-hole, the through-hole matches with a rotating shaft provided on the body so that the rotating member is rotated;

the lower connection board is connected with the slide-rail switch.

8. The terminal device according to claim 7, wherein the slide-rail switch comprises a slide rail, a slide button and a connection plug; and wherein the slide button is provided on the slide rail, and the slide button is slidable along the slide rail;

one end of the connection plug is connected with a lower end of the slide rail, and the other end of the connection plug is connected with the second elastic member;

a connection hole is also provided at one end of the slide rail, where the slide rail is connected with the connection plug, and the lower connection board is inserted into the connection hole.

9. The terminal device according to claim 6, wherein the upper connection board and a bending part of the holding board form a right angle, the lower connection board and the bending part of the holding board form an arc shape.

10. The terminal device according to claim 7, wherein the upper connection board and a bending part of the holding board form a right angle, the lower connection board and the bending part of the holding board form an arc shape.

* * * * *